(12) United States Patent  
Kanjo

(10) Patent No.: US 6,232,572 B1  
(45) Date of Patent: May 15, 2001

(54) SPOT WELDING CONTROL SYSTEM AND CONTROL METHOD

(75) Inventor: Mitsunori Kanjo, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/294,330

(22) Filed: Apr. 20, 1999

(30) Foreign Application Priority Data

Apr. 20, 1998 (JP) .................................... 10-109198  
Sep. 7, 1998 (JP) .................................... 10-252591

(51) Int. Cl.[7] .................................................. B23K 11/24
(52) U.S. Cl. ........................................ 219/110; 219/86.41
(58) Field of Search ..................... 219/110, 109, 219/86.41, 86.24, 86.7

(56) References Cited

U.S. PATENT DOCUMENTS 3,400,242   9/1968  Waller .
3,404,252 * 10/1968  Michael .............................. 219/110
3,585,347 *  6/1971  Needham et al. .................... 219/110
4,912,294 *  3/1990  Tsujii ................................ 219/86.24
5,483,035 *  1/1996  Kawai et al. ....................... 219/110
5,514,846 *  5/1996  Cecil et al. ........................ 219/110
5,764,859 *  6/1998  Kim et al. .......................... 219/109
6,020,569 *  2/2000  Cecil et al. ........................ 219/109

FOREIGN PATENT DOCUMENTS 48-41422   12/1973  (JP) .
53-4057     2/1978  (JP) .
7-232279    9/1995  (JP) .

* cited by examiner

*Primary Examiner*—Clifford C. Shaw  
(74) *Attorney, Agent, or Firm*—McDermott, Will & Emery

(57) ABSTRACT

Paired electrodes, of which a wear amount is detected, press workpieces to be welded, conducting a current therethrough, and have an inter-electrode displacement amount varying during the current conduction, which displacement amount is detected continuously from a reference position (a). Detected inter-electrode displacement amounts are corrected in dependence on the detected wear amount, and corrected inter-electrode displacement amounts (h) are based on to make a decision of a welding state of the workpieces.

15 Claims, 12 Drawing Sheets

FIG.10

| | WELDING CURRENT Iw | CONDUCTION TIME Tw | PRESSURE Pw | ELECTRODE TIP DIAMETER Cw |
|---|---|---|---|---|
| +C RANK | REDUCE | - | INCREASE | - |
| +B RANK | SLIGHTLY REDUCE | SLIGHTLY REDUCE | SLIGHTLY INCREASE | - |
| A RANK | - | - | - | - |
| -B RANK | SLIGHTLY INCREASE | SLIGHTLY INCREASE | - | - |
| -C RANK | INCREASE | - | - | DRESS TIP |

SPOT WELDING CONTROL SYSTEM AND CONTROL METHOD

BACKGROUND OF THE INVENTION

The present invention relates to a spot welding control system and a spot welding control method for a high quality spot welding to be achieved by detecting time-dependent variations of inter-electrode displacement amount while welding.

A sureness or state of a spot welding is inspected by examining an attribute of a thermal expansion of a welding object during conduction of welding current or along a growth of a nugget: by a maximum displacement in Japanese Patent P48-41422 and Japanese Patent P53-4057, by a displacement rate in U.S. Pat. No. 3,400,242 and Japanese Patent P53-4057, and by a contracting state in Japanese Patent Application Laid-Open Publication No. 7-232279.

SUMMARY OF THE INVENTION

However, as an estimated nugget diameter constitutes a base for a decision on a conformity of a quality or sureness of an associated welding, it is difficult to know a quantitative conformity if welding electrodes are brought into irregular contact with workpieces to be welded, which may cause flash or expulsion while welding, or may have a varying initial contact resistance, or welding currents shunting to neighboring welded spots.

For example, as illustrated in FIG. 2A, if workpieces W to be welded are gapped to each other when welding, there may develop time-dependent variations of inter-electrode displacement amount such that, as illustrated in FIG. 12B, a maximum displacement hmax thereof is significantly smaller than a maximum displacement Hmax to be observed under a normal state (with electrodes perpendicular to workpieces and without gaps between the workpieces).

Further, as illustrated in FIG. 13A, if electrodes 1 are inclined to workpieces W when welding, i.e. in a case of inclined welding angle, there may also develop time-dependent variations of inter-electrode displacement amount such that, as illustrated in FIG. 13B, a maximum displacement hmax thereof is significantly smaller than a maximum displacement Hmax to be observed under a normal state.

In either example, there may well be given a smaller inter-electrode displacement rate dh/dt than the normal state.

In either case, or if workpieces are gapped or an inadequate welding angle appears while welding, the welding may be decided to be non-conforming, even when a conforming welding quality is finally achieved.

Further, as data on inter-electrode displacement amount sampled from a current welding are employed ex post facto for a decision on a conformity of a subsequent welding, a feedback of a result therefrom to any welding condition cannot be effective before the subsequent welding, thus resulting in a default decision of non-conformity up to the current welding, yielding one or more non-conforming products.

The present invention has been achieved with such points in view.

It therefore is a first object of the invention to provide a spot welding control system and a spot welding control method which allow, irrespective of a state of electrodes contacting on workpieces, for a nugget diameter (in terms of a quality or sureness of an associated welding) to be estimated from time-dependent variations of inter-electrode displacement amount, with a sufficient accurately for the result to be based in calculation for optimization of welding conditions, as necessary to achieve a conforming quality.

It is a second object of the invention to provide a spot welding control system and a spot welding control method which allow, irrespective of a state of electrodes contacting on workpieces, for optimal welding conditions to be set in real time on a basis of variations of inter-electrode displacement amount, as they are detected along with time.

To achieve the first object, an aspect of the invention provides a spot welding control system comprising a pair of electrodes pressing a welding object, conducting a current therethrough, an inter-electrode displacement amount detector detecting an inter-electrode displacement amount of the pair of electrodes substantially continuously from a reference position, and a welding state decision maker making a decision on a welding state of the welding object in dependence on inter-electrode displacement amounts detected by the inter-electrode displacement amount detector.

Another aspect of the invention provides a spot welding control system comprising a pair of electrodes pressing a welding object, conducting a current therethrough, a wear amount detector detecting a wear amount of the pair of electrodes, an inter-electrode displacement amount detector detecting an inter-electrode displacement amount of the pair of electrodes substantially continuously from a reference position, and a welding state decision maker correcting inter-electrode displacement amounts detected by the inter-electrode displacement amount detector in dependence on the wear amount detected by the wear amount detector and making a decision on a welding state of the welding object in dependence on corrected inter-electrode displacement amounts.

Another aspect of the invention provides a spot welding control method comprising pressing a welding object by a pair of electrodes, conducting a current therethrough, detecting an inner-electrode displacement amount of the pair of electrodes substantially continuously from a reference position during the conducting, and making a decision on a welding state of the welding object in dependence on detected inter-electrode displacement amounts Another aspect of the invention provides a spot welding control method comprising detecting a wear amount of a pair of electrodes, pressing a welding object by the pair of electrodes, conducting a current therethrough, detecting an inter-electrode displacement amount of the pair of electrodes substantially continuously from a reference position during the conducting, and correcting detected inter-electrode displacement amounts in dependence on the wear amount detected and making a decision on a welding state of the welding object in dependence on corrected inter-electrode displacement amounts.

Further, to achieve the second object, an aspect of the invention provides a spot welding control system comprising a pair of electrodes pressing a welding object, conducting a current therethrough, an inter-electrode displacement amount detector substantially continuously detecting an inter-electrode displacement amount of the pair of electrodes, a reference inter-electrode displacement amount memory having preset reference inter-electrode displacement amounts stored therein, a comparator comparing inter-electrode displacement amounts detected by the inter-electrode displacement amount detector with reference inter-electrode displacement amounts stored in the reference inter-electrode displacement amount memory, a welding condition setter setting a welding condition of the welding object in accordance with a result of comparison by the comparator, and a current conduction controller controlling a current conducting state of the pair of electrodes in dependence on the welding condition set by the welding condition setter.

Another aspect of the invention provides a spot welding control system comprising a pair of electrodes pressing a welding object, conducting a current therethrough, a wear amount detector detecting a wear amount of the pair of electrodes, an inter-electrode displacement amount detector substantially continuously detecting an inter-electrode displacement amount of the pair of electrodes, a reference inter-electrode displacement amount memory having preset reference inter-electrode displacement amounts stored therein, a comparator correcting inter-electrode displacement amounts detected by the inter-electrode displacement amount detector in dependence on the wear amount detected by the wear amount detector, to compare with reference inter-electrode displacement amounts stored in the reference inter-electrode displacement amount memory, a welding condition setter setting a welding condition of the welding object in accordance with a result of comparison by the comparator, and a current conduction controller controlling a current conducting state of the pair of electrodes in dependence on the welding condition set by the welding condition setter.

Another aspect of the invention provides a spot welding control system comprising a pair of electrodes pressing a welding object, conducting a current therethrough, an inter-electrode displacement amount detector substantially continuously detecting an inter-electrode displacement amount of the pair of electrodes, a regression line calculator calculating a regression line from inter-electrode displacement amounts detected by the inter-electrode displacement amount detector, a reference regression line memory having stored therein a reference regression line based on a reference inter-electrode displacement amount, a comparator comparing the regression line calculated by the regression line calculator with the reference regression line stored in the reference regression line memory, a welding condition setter setting a welding condition of the welding object in accordance with a result of comparison by the comparator, and a current conduction controller controlling a current conducting state of the pair of electrodes in dependence on the welding condition set by the welding condition setter.

Another aspect of the invention provides a spot welding control system comprising a pair of electrodes pressing a welding object, conducting a current therethrough, a wear amount detector detecting a wear amount of the pair of electrodes, an inter-electrode displacement amount detector substantially continuously detecting an inter-electrode displacement amount of the pair of electrodes, a regression line calculator correcting inter-electrode displacement amounts detected by the inter-electrode displacement amount detector in dependence on the wear amount detected by the wear amount detector and calculating a regression line from corrected inter-electrode displacement amounts, a reference regression line memory having stored therein a reference regression line based on a reference inter-electrode displacement amount, a comparator comparing the regression line calculated by the regression line calculator with the reference regression line stored in the reference regression line memory, a welding condition setter setting a welding condition of the welding object in accordance with a result of comparison by the comparator, and a current conduction controller controlling a current conducting State of the pair of electrodes in dependence on the welding condition set by the welding condition setter, Another aspect of the invention provides a spot welding control method comprising pressing a welding object by a pair of electrodes, conducting a current therethrough, substantially continuously detecting un inter-electrode displacement amount of the pair of electrodes during the conducting, comparing detected inter-electrode displacement amounts with preset reference inter-electrode displacement amounts, setting a welding condition of the welding object in accordance with a result of comparison, and controlling a current conducting state of the pair of electrodes in dependence on the set welding condition.

Another aspect of the invention provides a spot welding control method comprising detecting a wear amount of a pair of electrodes, pressing a welding object by the pair of electrodes, conducting d current therethrough, substantially continuously detecting an inter-electrode displacement amount of the pair of electrodes during the conducting, correcting detected inter-electrode displacement amounts in dependence on the detected wear amount, comparing corrected inter-electrode displacement amounts with preset reference inter-electrode displacement amounts, setting a welding condition of the welding object in accordance with a result of comparison, and controlling a current conducting stale of the pair of electrodes in dependence on the set welding condition.

Another aspect of the invention provides a spot welding control method comprising pressing a welding object by a pair of electrodes, conducting a current therethrough, substantially continuously detecting an inter-electrode displacement amount of the pair of electrodes during the conducting, calculating a regression line from detected inter-electrode displacement amounts, comparing the calculated regression line with a preset reference regression line, setting a welding condition of the welding object in accordance with a result of comparison, and controlling a current conducting State of the pair of electrodes in dependence on the set welding condition.

Another aspect of the invention provides a spot welding control method comprising detecting a wear amount of a pair of electrodes, pressing a welding object by the pair of electrodes, conducting a current therethrough, substantially continuously detecting an inter-electrode displacement amount of the pair of electrodes during the conducting, correcting detected inter-electrode displacement amounts in dependence on the detected wear amount, calculating a regression line from corrected inter-electrode displacement amounts, comparing the calculated regression line with a preset reference regression line, setting a welding condition of the welding object in accordance with a result of comparison, and controlling a current conductucting state of the pair of electrodes in dependence on the set welding condition.

BRIEF DESCRIPTION OF THE DRAWINGS

The above and further objects and novel features of the present invention will more fully appear from the following detailed description when the same is read in conjunction with the accompanying drawings, in which:

FIG. 10 is a table listing elementwise instructions for changing welding conditions;

DETAILED DESCRIPTION OF THE PREFERRED EMBODIMENTS

Figure 1:
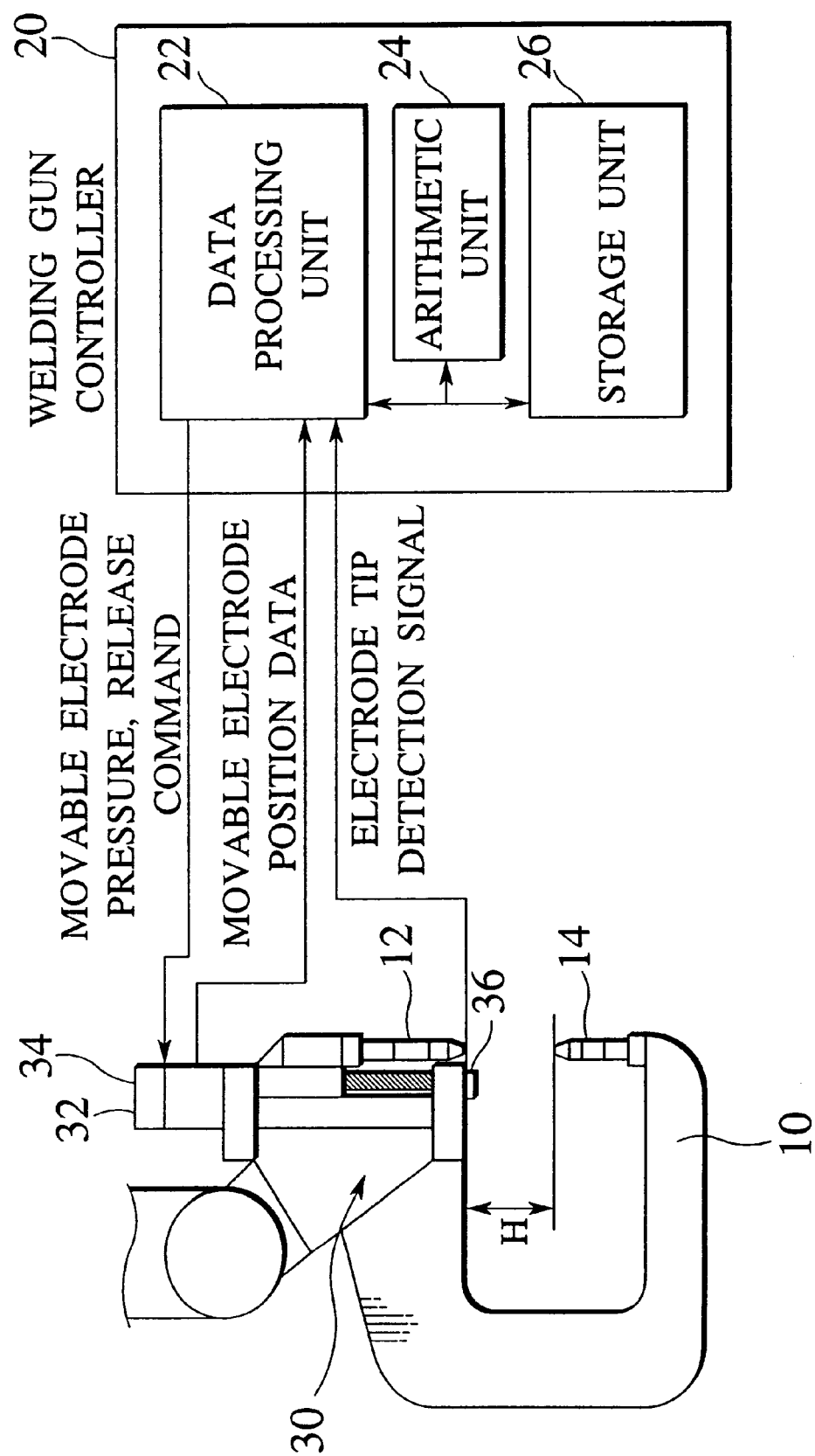
FIG. 1 is a schematic diagram of a spot welding control system according to an embodiment of the invention, and a welding gun of which actions are controlled by the controller.

There will he detailed the preferred embodiments of the present invention, with reference to the accompanying drawings. Like elements are designated by like reference characters.

FIG. 1 is a diagram schematically showing a spot welding control system according to a first embodiment of the invention, and a welding gun 10 of which actions are governed by the control system.

The spot welding control system comprises a welding gun controller 20 for controlling actions of the welding gun 10, and d sensor unit 30 for detecting an acting condition of the welding gun 10.

The welding gun controller 20 includes a data processing unit 22, an arithmetic unit 24, and a storage unit 26 as a memory.

The data processing unit 22 inputs therein detection information or data (a movable electrode position data and an electrode up detection signal) output from the sensor unit 30, and outputs a time-dependent variation of an amount of an inter-electrode displacement (as an inter-electrode displacement amount data) based on the detection information to the arithmetic unit 24 and the storage unit 26. The data processing unit 22 also outputs a movable electrode press command and a movable electrode release command in accordance with programs stored in the storage unit 26 for operations of the welding gun 10.

The arithmetic unit 24 performs arithmetic operations for estimations such as of a wear amount of a mobile or movable electrode 12, a wear amount of a stationary or fixed electrode 14, a correction amount against the wear amounts, and a decision of a welding state, on bases of the detection information from the data processing unit 22 and various data (an initial position, a reference position, a press position or pressure-exerting position, a reference press position or reference pressure-exerting position, the inter-electrode displacement amount data, and a reference data) stored in the storage unit 26.

The storage unit 26 stores therein the detection information from the data processing unit 22, the initial position (an original position), the reference position, the pressure-exerting position and the reference pressure-exerting position of the movable electrode 12. The storage unit 26 stores also the correction amount against the wear amounts of the movable electrode 12 and the fixed electrode 14, a data on the time-dependent variation of the inter-electrode displacement amount output from the data processing unit 20 as the inter-electrode displacement amount data (to be compared with the reference data). It further stores the reference data preset for a decision that a spot welding operation as well as the operation program of the welding gun 10 is properly executed (to have a nugget generated with a sufficient diameter).

Figure 12A:
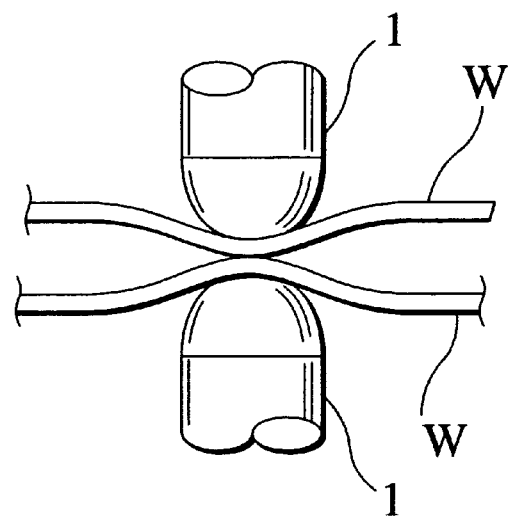
FIG. 12A is a side view of a gapped sample subjected to a welding between electrodes with a zero welding angle.
Figure 12B:
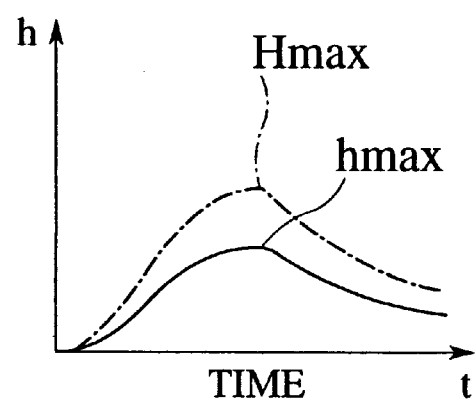
FIG. 12B is a graph describing an attribute of data sampled in the welding of FIG. 12A.
Figure 13A:
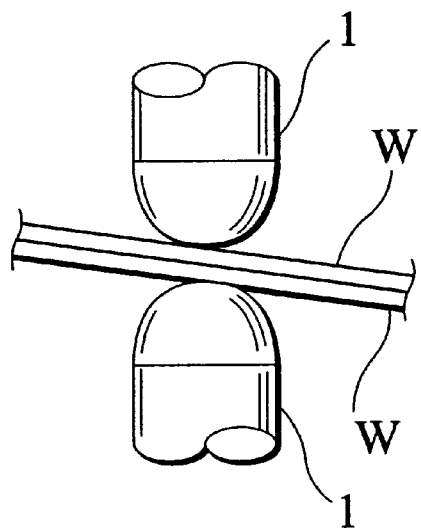
FIG. 13A is a side view of a gap-less sample subjected to a welding between electrodes with a specified welding angle.
Figure 13B:
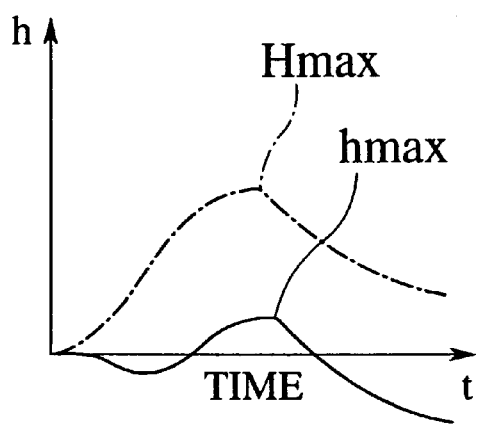
FIG. 13B is a graph describing an attribute of data sampled in the welding of FIG. 13A.

The reference data is a data comprising time-dependent variations of the inter-electrode displacement amount obtained under a normal state (a state in which workpieces have no gap therebetween and a welding forces or pressing force or pressure by the electrodes is perpendicularly imposed or acting or exerted on the workpieces), and a maximum displacement amount Hmax therein, as illustrated by dotted lines in FIGS. 12B and 13B, for example.

The arithmetic unit 24 compares the inter-electrode displacement amount data stored in the storage unit 26 with the reference data, to thereby decide whether or not the sureness of a welding state is sufficient, or whether or nor a problem of a welding quality is found. As a result of the decision, if the welding quality is decided to be problematic, there is prepared an optimum welding condition to be employed as a welding condition in subsequent welding operations. The prepared welding condition is set in an external unit for controlling a welding current.

The sensor unit 30 includes an encoder 32 functioning as an inter-electrode displacement amount detection means, and an electrode tip detection sensor 34 applicable to determinations such as of wear amounts and a reference position of the electrodes.

The encoder 32 is a sensor for detecting a position of the movable electrode 12 of the welding gun 10. This position is detected from an amount of rotation of a servo motor 34 for elevating or lowering the movable electrode 12.

The electrode tip detection sensor 36 is a sensor for detecting a position of a tip end of the movable electrode 12, and is employed for a detection of the wear amount of the movable electrode 12 in terms of the amount of a displacement (as a later-described movable electrode position data (1)) of the movable electrode 12 between from a preset initial position (on original position) to a position when the tip end of the movable electrode 12 is detected by the electrode tip detection sensor 36.

Next, functions of the spot welding, control system of FIG. 1 will be described.

The spot welding control system controls actions of the welding gun 10 in accordance with procedures described below.

Calculation of a Correction Amount Based on Electrode Wear Amounts

The spot welding control system detects wear amounts of a movable electrode 12 and a fixed electrode 14 before it welding therebetween, and is responsible for the wear amounts to correct an initial position (an original position) set for the movable electrode 12. In this respect, the movable electrode 12 and the fixed electrode 14 are worn at their tips every repeated welding. The inter-electrode displacement data obtained from between the movable and fixed electrodes 12 and 14 in their worn states is varied from that between the movable and fixed electrodes 12 and 14 in their non-used states. This makes it difficult to estimate an accurate welding state. To avoid such a difficulty, there is made a correction based on the wear amounts of the movable and fixed electrodes 12 and 14.

A particular procedure for correction by detecting wear amounts of the electrodes will be described below.

First, a movable electrode press command is output from the data processing unit 22 to operate a servo motor 34. Until a tip end of the movable electrode 12 is detected by the electrode tip detection sensor 36, the movable electrode 12 is lowered from a currently-set initial position (an original position). In the process, an amount of rotation of the servo motor 34, i.e. a displacement amount of the movable electrode 12 from the initial position, is detected by the encoder 32 and input as a movable electrode position data (1) via the data processing unit 22 to the arithmetic unit 24.

The arithmetic unit 24 compares the movable electrode position data (1) just measured with a movable electrode position data (1) of a non-used state of the movable electrode 12 stored in the storage unit 26. If the two movable electrode position data (1) have different values to each other, the difference (an estimated wear amount) is stored in the storage unit 26 as a correction amount simply for the movable electrode 12.

After the correction amount of the movable electrode 12 is calculated, another movable electrode press command is output from the data processing unit 22 to thereby operate the servo motor 34. The movable electrode 12 is lowered until the tip end of the movable electrode 12 has a zero-force contact established relative to a tip end of the fixed electrode 14. The zero-force contact is detectable from a drive current of the servo motor 34. In the process, a rotational amount of the servo motor 34, i.e. a displacement amount of the movable electrode 12 from the initial position thereof, is detected by the encoder 32 and input to the arithmetic unit 24 as a movable electrode position data (2) via the data processing unit 12.

The arithmetic unit 24 compares the movable electrode position data (2) just measured with a movable electrode position data (2) obtained from between the non-used state of the movable electrode 12 and a non-used state of the fixed electrode 14 stored in the storage unit 26. If the two movable electrode position data (2) have different values to each other, the difference (a sum of estimated wear amounts of the movable electrode 12 and the fixed electrode 14) is calculated, and the correction amount (the estimated wear amount) previously determined simply of the movable electrode 12 is subtracted from the difference, to thereby estimate a wear amount of the fixed electrode 14. This amount is stored in the storage unit 26 as a correction amount for the fixed electrode 14.

Setting a Reference Position for Starting a Measurement of the Inter-electrode Displacement Date After calculation of the correction amounts of the electrodes 12 and 14 in the procedure described above, the movable electrode 14 is set in a reference position for starting a measurement of the inter-electrode displacement data.

A particular procedure for setting the reference position will be described below.

First, the arithmetic unit 24 calculates a reference position on bases of the displacement amount by which the non-used movable electrode 12 was displaced from the initial position thereof to the position where it had an established contact with the non-used fixed electrode 14, as the amount is stored in the storage unit 26, a total thickness of workpieces to be joined together, and the correction amounts of the movable electrode 12 and the fixed electrode 14. The total thickness of the workpieces is subtracted from the displacement amount by which the non-used movable electrode 12 was displaced from the initial position thereof to the contact position with the non-used fixed electrode 14, and a resultant difference is added to the correction amounts of the movable electrode 12 and the fixed electrode 14, to provide the reference position. In other words, the reference position is provided for a combination of a non-used movable electrode 12 and a non-used fixed electrode 14, as a position at which a tip end of the movable electrode 12 comes into a pressure-free contact with a workpiece to be welded, or a position that the movable electrode 12 has when normally entering a pressure exertion onto the workpiece. This reference position is stored in the storage unit 26.

In the case the electrode gun 10 has no workpieces inserted in an arm spacing H thereof, the movable electrode 12 can still descend from the reference position to reach a lower position for its tip end to enter exertion of a predetermined pressure on the fixed electrode 14, i.e. the position of a tip end of the fixed electrode 14. This position is stored as a reference pressing position in the storage unit 26.

After estimation of the reference position by calculation of the arithmetic unit 24, the workpieces are fixed in position to be kept in contact with the fixed electrode 14 in the arm spacing of the welding gun 10, and another movable electrode press command is output from the data processing unit 22 to operate the servo motor 34. Accordingly, the movable electrode 12 is lowered to a position for its tip end to have a pressure-less contact with a workpiece, i.e. to the estimated reference position.

Decision for an Adequate Pressing Position to the Workpiece

Then, relative to the reference position as a reference, the movable electrode 12 is further lowered so that a desirable pressure is exerted on the workpieces. In the process, the servo motor 34 is torque-controlled. The movable electrode 12 is thus naturally stops when a desirable pressure (torque) is exerted on the workpieces. By detecting this lowered position (a pressing position), it can be determined how the workpieces are pressed by the electrodes 12 and 14 (in a normal slate, or in a state with an improper welding angle or with a gap between the workpieces). Thus, welding conditions (a welding pressure, a welding current, and a current conduction time) are corrected in accordance with the detected pressing position. If the detected pressing position is significantly improper, the welding is interrupted, for checks such as on the workpieces that may be other than a specified kind, or for apprehensions of any trouble.

A particular procedure for deciding whether the pressing position of the workpieces is proper or not will be described below.

A movable electrode press command is output from the data processing unit 22 to operate the servo motor 34, and the movable electrode 12 having been lowered to the reference position is further lowered, exerting a predetermined pressure. The encoder 32 detects a displacement amount by which the movable electrode 12 is displaced from the reference position to a position where the movable electrode 12 is stopped, exerting the predetermined pressure on the workpieces. Based on the displacement amount and the reference position, there are calculated the position of the movable electrode 12 as a pressing position. The pressing position is stored in the storage unit 26.

Next, in the arithmetic unit 24, there are executed a comparison between the pressing position stored in the storage unit 26 and a first reference position that is a sum of the reference pressing position (i.e. the tip end position of the fixed electrode 14) stored in the storage unit 26, the total thickness of the workpieces to be welded together, and a positive allowance as a permissible limit to be added. In the case the pressing position is in excess of the first reference position (i.e. if the pressing position resides on a movable-electrode side of the first reference position), there may be a gap between the workpieces, or an improper welding angle. Accordingly, some of welding conditions stored in the storage unit 26 that are most suitable to such a situation are selected and set in the external unit for controlling the welding current.

Further, in the arithmetic unit 24, there is executed another comparison between the pressing position stored in the storage unit 26 find a second reference position that is a sum of the total thickness of the workpieces to be welded together, the reference pressing position stored in the storage unit 26, and a negative allowance as a permissible limit to be subtracted. In the case the pressing position is in excess of the second reference position (i.e, if the pressing position resides on a fixed-electrode side of the second reference position), the result means that the movable electrode 12 and the fixed electrode 14 are opposed to each other at a smaller distance than the total thickness of the workpieces, and is followed by a decision that the movable electrode 12 or the fixed electrode 14 has a non-conformity or that the workpieces are under inadequate welding conditions, whereby an "abnormal" signal is output to interrupt the welding operation.

Spot Welding

In accordance with welding conditions (welding pressure, welding current, and current conduction time) set in a described manner, the welding gun 10 is controlled to exert a thus set pressure on the workpieces, and the current-controlling external unit is driven to supply a thus set welding current to the welding gun 10 for a thus set current conduction time.

Judgment on the Spot Welding

Displacements of the movable electrode 12 during a spot welding operation are input as a temporal sequence of inter-electrode displacement amount data to the data processing unit 22 and stored in the storage unit 26. The arithmetic unit 24 produces such a graph as conceptionally illustrated in FIG. 2, based on the temporal sequence of inter-electrode displacement amount data and the correction amounts of the electrodes 12, 14 stored in the storage unit 26.

Figure 2:
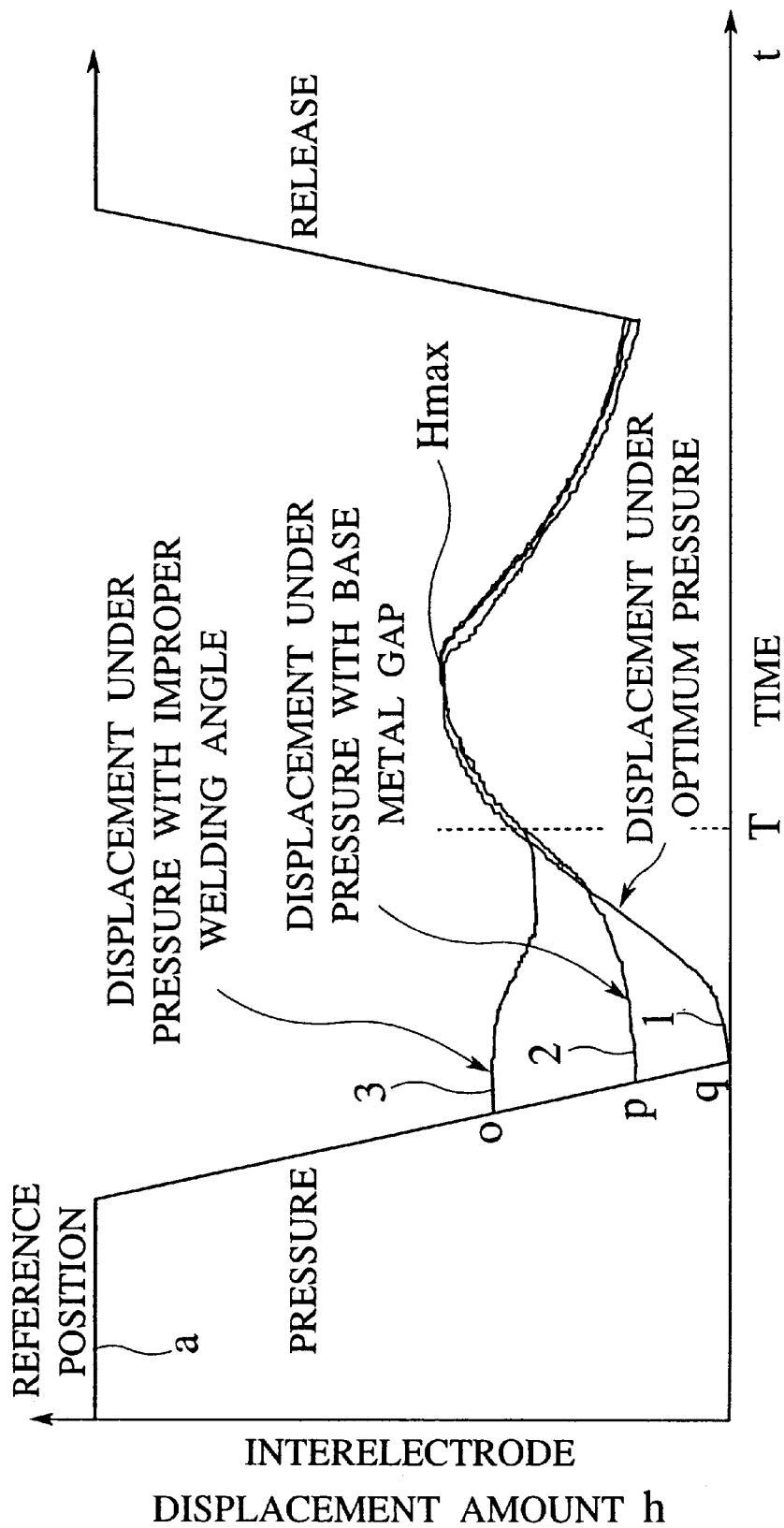
FIG. 2 is a graph describing an inter-electrode displacement amount data representative of a time-dependent variation of an inter-electrode displacement amount h of a movable electrode.

The graph shown in FIG. 2 is obtained by plotting, versus a current conduction time t, an associated inter-electrode displacement amount h of the movable electrode 12 relative to a reference position (designated by "a"). The movable electrode 12 descends from the reference position toward the fixed electrode 14, exerting pressures on the workpieces, and stops at is position (the pressing position) where a predetermined pressure is exerted on the workpieces.

As shown in FIG. 2, when the pressure is exerted under normal conditions, the inter-electrode displacement amount h changes like a curve 1 starting at a point q (a pressing position) and reaches a maximum displacement amount Hmax during the change. In a case a gap is left between the workpieces, the inter-electrode displacement amount h changes like a curve 2 starting at a point (a pressing position) higher (located on a movable-electrode side) than the point q of the pressure exertion under the normal conditions and reaches a maximum displacement amount Hmax during the change. Further, in a case the electrodes 12 and 14 have an improper welding angle to the workpieces, the inter-electrode displacement amount h changes like a curve 3 starting from a point o (a pressing position) still higher (displaced on the movable-electrode side) than the point p and reaches a maximum displacement amount Hmax during the change.

As such, the pressing position is different (q, p, o) among the case of pressure exertion under normal conditions, the case of a gap left between the workpieces, and the case of an improper welding angle set for the electrodes 12, 14 to have to the workpieces. In any case, however, after a current conduction time T when a current conduction starts and the workpieces enter their melting states, the inter-electrode displacement amount h shows like changes, and reaches a maximum inter-electrode displacement amount Hmax on the way of change.

This characteristic is utilized herein so that inter-electrode displacement amount data measured on and after the current conduction lime T are compared with the reference data, to thereby effect an accurate decision of whether an adequate welding is performed or not.

In other words, the inter-electrode displacement amount data measured on and after the current conduction time T are collated relative to a permissible range of the reference data stored in the storage unit 26. If the inter-electrode displacement amount data fall within a predetermined range (between permissible limits) of the reference data, there is made a decision such that an adequate welding is performed. Unless they fall within the range, such a decision is made that an inadequate welding is performed, and followed by a setting of welding conditions for the next and subsequent welding operations in dependence on a degree of deviation from the reference data.

As such, in this embodiment, there are taken inter-electrode displacement amount data relative to the reference position as a reference. One can take inter-electrode displacement amount data relative to a pressing position, with a resultant performance curve having an increased tendency to deviate from a reference data, as illustrated by dotted lines in FIGS. 12B or 13B. Note that in the embodiment which has inter-electrode displacement amount data obtained relative to a reference position, the former has a matching level region permitting a comprehensive comparison with a reference data.

Figure 3:
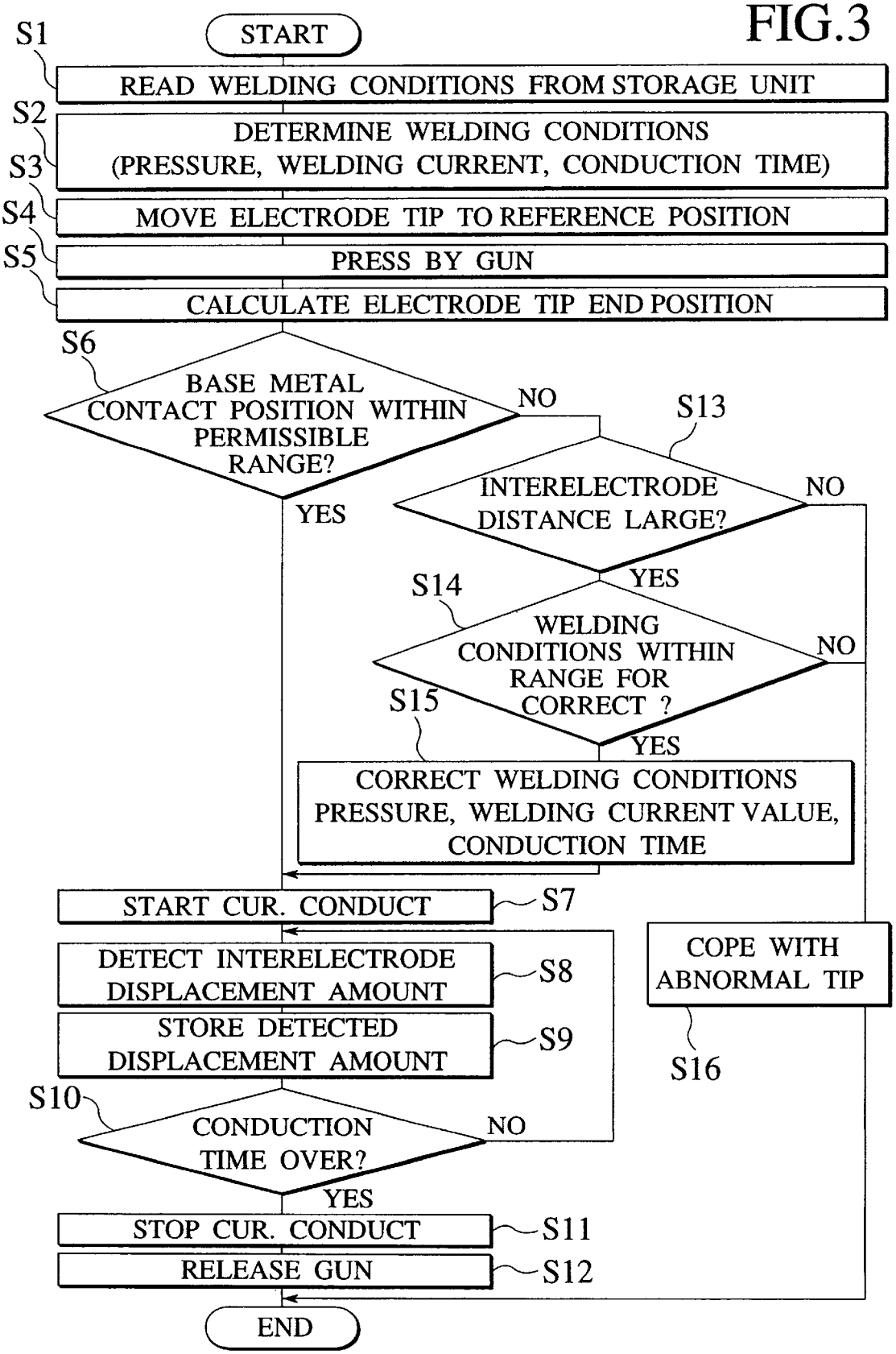
FIG. 3 is a flowchart of actions of the spot welding control system of FIG. 1.

A welding process according to the above embodiment will be described with reference to a flowchart of FIG. 3.

The arithmetic unit 24 reads stored welding conditions from the storage unit 26 (at a step S1), and sets particular welding conditions: a welding pressure to be exerted on workpieces to be welded together, a welding current, and a current conduction time, based on the read conditions (at a step S2). Then, a tip end of a movable electrode 12 is moved to a reference position (a position for the tip end to contact on a workpiece under a normal condition) (at a step S3), the movable electrode 12 is further lowered from the reference position, pressing the workpieces (at a step S4), and a pressing position of the movable electrode 12 is calculated from a displacement amount of the movable electrode 12 relative to the reference position (at a step S5).

Then, there is made a decision of whether the pressing position is in excess of a first reference position or a second reference position (at a step S6). As a result of the decision, if The pressing position is interposed between the first reference position and the second reference position, it means a normal state, and there is started a spot welding operation under the set welding conditions (at a step S7). During the welding operation, there is performed a continuous detection in which an inter-electrode displacement amount is detected, at intervals of a predetermined time until the current conduction time ends, and stored in the storage unit 26 (at steps S8 to S10). As the current conduction time is over, the current conduction is stopped (at a step S11), the gun is opened to release the welded workpiece (at a step S12), and the spot welding operation goes to an end.

At the step S6, if the pressing position is decided to be in excess of the first reference position (i.e. if the pressing position is on a movable-electrode side of the first reference position), it means the electrodes are located at a larger distance from each other than in the normal state (at a step SI3), and another decision is made of whether or not the pressing position is within a range in which the welding conditions can be corrected (at a Step S14). If it is within the range, there is made a correction of the set welding conditions (the pressure, the welding current, and the current conduction time) in dependence on the pressing position (at a step S15). In the case the pressing position is decided to be in excess of the second reference position (i.e. the pressing position is on a fixed-electrode side of the second reference position), it means the distance between the electrodes is smaller than that in the normal state (at the step S13), and with a judgment that the movable electrode 12 or a fixed electrode 14 is not normal or the welding conditions are inadequate for the workpieces, it so follows that an "abnormal" signal is output to thereby interrupt the welding operation. Even in the case of a decision for the pressing position exceeding the first reference position (i.e. for the pressing position on the movable-electrode side of the first reference position), if the pressing position has significantly exceeded the range in which the welding conditions can be corrected, then a proper welding cannot be ensured, and an "abnormal" signal is output to thereby interrupt the welding operation (steps S13 and S14), before taking necessary measures such as for coping with an abnormality of electrode tip (at a step S16).

As such, in the present embodirnrnt, inter-electrode displacement amount data measured along a current conduction time T are compared with reference data, for an accurate decision of whether a proper welding is performed or not, in any of the cases where a pressing is performed in a normal state, where workpieces to be welded together have a gap therebetween, and where electrodes 12 and 14 have an inadequate welding angle to workpieces.

According to the embodiment described, data on an inter-electrode displacement amount are sampled relative to a reference position as a reference, and on the basis of sampled data, there is made a decision of whether a proper welding is performed, or an update of welding conditions for a subsequent welding operation There will be described another embodiment of the invention, in which data on an inter-electrode displacement amount are sampled in a different manner, and on the basis of sampled data, there are executed real time calculations of significant attributes of a welding workpiece, such as an expansion rate, a saturated thermal expansion, a saturation time and a shrink or contraction time, to thereby estimate the magnitude of a current density in a welding being performed, for welding conditions to be changed in real time in dependence on a result of the estimation.

According to the embodiment, a displacement amount between a pair of electrodes is continuously detected from a reference position, and based on detected inter-electrode displacement amounts, a decision is made on a welding state of workpieces, permitting an accurate decision irrespective of a pressed state of workpieces.

Further, welding conditions are set in dependence on a detected thickness of workpieces, so that the welding is performed under more favorable welding conditions irrespective of a pressed state of workpieces.

Further, providing a correction of inter-electrode displacement amount in dependence on a detected wear amount of electrodes various displacement amounts from a reference position are continuously detected between the electrodes, and based on thus detected inter-electrode displacement amounts, a decision is made of a welding state of workpieces, permitting an accurate decision irrespective of a pressed state nor degree of wear of the workpieces.

Further, inter-electrode displacement amounts are corrected in dependence on a wear amount of electrodes, and welding conditions are set in accordance with a pressed state of workpieces, as it is detected, permitting a welding under more favorable welding conditions regardless of a pressed state or degree of wear of the workpieces.

A second embodiment of the invention will be detailed below with reference to the drawings.

Figure 4:
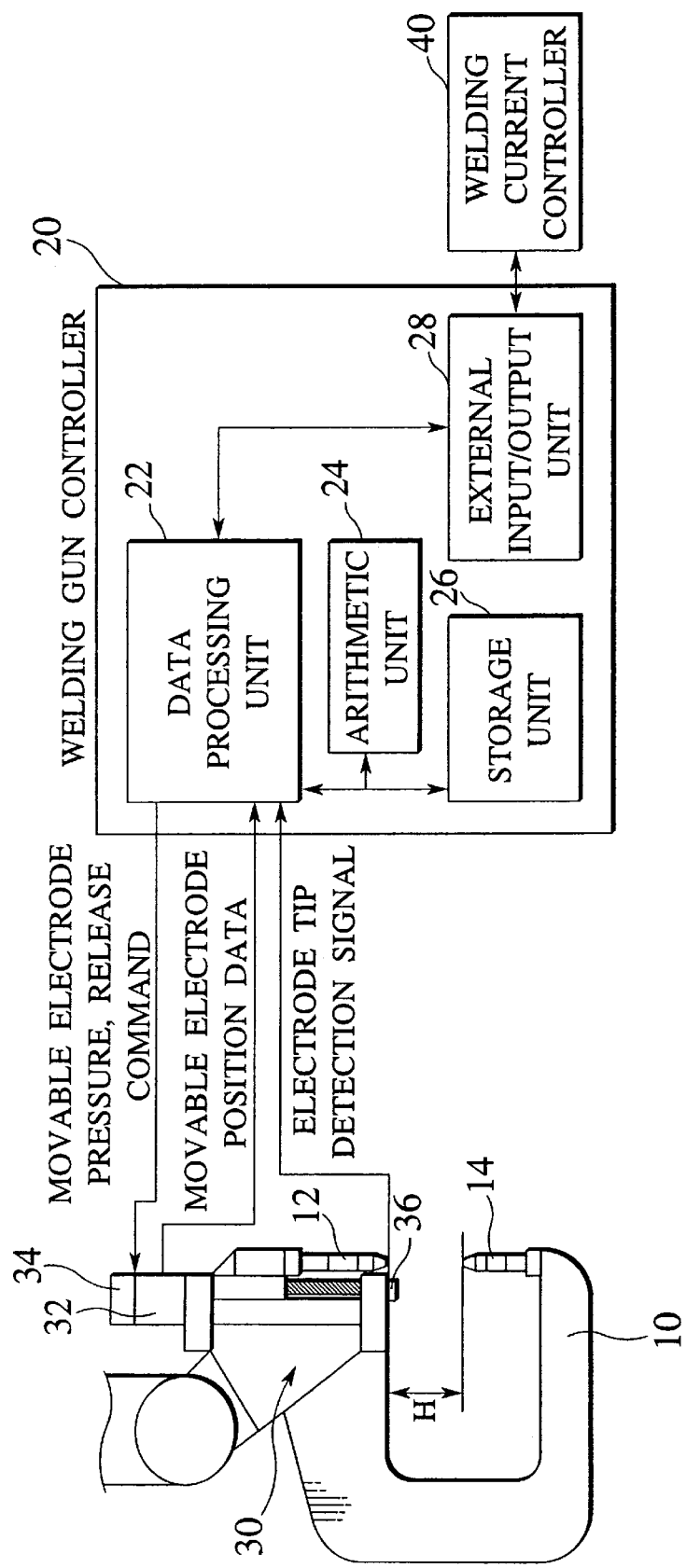
FIG. 4 is a schematic diagram of a spot welding control system according to another embodiment of the invention, and a welding gun of actions are controlled by the controller.

FIG. 4 shows, in a schematic block diagram, a spot welding control system according to the second embodiment, and a welding gun 10 of which actions are governed by the control system.

The spot welding control system of the second embodiment includes a welding current controller 40 for supplying a welding current to be conducted through electrodes of the welding gun 10. The welding gun controller 20 has an external input/output unit 28 as a data interface for two-way communication with the welding current controller 40.

The welding gun controller 20 has a pair of selective correction modes: an automatic correction mode in which welding conditions are automatically corrected in dependence on an estimated current density; and a manual correction mode in which welding conditions are manually corrected by an operator. Either mode is selective by a button operation at a control panel (not shown) of the welding gun controller 20.

A data processing unit 22 receives detection data (a movable electrode position data and an electrode tip detection signal) output from a sensor unit 30. The detection data are processed, e.g. to have a time-dependent variation of inter-electrode displacement amount output to an arithmetic unit 24 and a storage unit 26, or for execution of a welding gun operation program stored in the storage unit 26 to output a movable electrode press command or a movable electrode release command.

The external input/output unit 28 may be connected to a welding robot control section (not shown) of the welding control system, for transmission and reception of real time control data. The robot control section controls a welding robot for manipulating the welding gun 20.

The arithmetic unit 24 executes arithmetic operations, such as for calculation of a regression line, estimation of a current density, and a real time decision of a welding state (or a welding quality), on bases of detection data received from the data processing unit 22 and various data (an initial position, a reference position, a pressing position, a reference pressing position, an inter-electrode displacement amount data, a reference inter-electrode displacement amount, a regression model, an electrode tip diameter, and a proper current density) stored in the storage unit 26.

Figure 9:
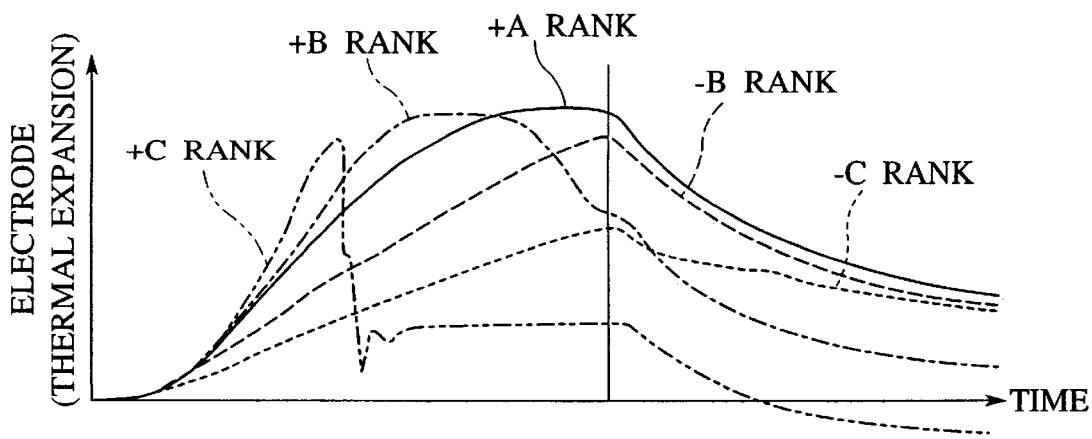
FIG. 9 is a graph describing an exemplary regression model.

The storage unit 26 is adapted for storing data, e.g. detection data from the data processing unit 22, data on the initial position (an original position), the reference position, the pressing position, and the reference pressing position of a movable electrode 12, data on a correction amount against wear amounts of the movable electrode 12 and a fixed electrode 14, data on time-dependent variations of inter-electrode displacement amount to be output from the data processing unit 20 as inter-electrode displacement amount data (for comparison with reference data), data on the regression model having a reference inter-electrode displacement amount and a reference regression line preset for a decision that a spot welding as well as an operation program for the welding gun 10 is adequately performed (for a nugget to be generated with a sufficient diameter or size), and data on a proper current density as a reference for a decision of whether welding conditions should be updated or not. The reference inter-electrode displacement amount and the regression model are each provided in the form of a set of data such as on time-dependent variations of inter-electrode displacement amount as illustrated in FIG. 9.

Figure 8:
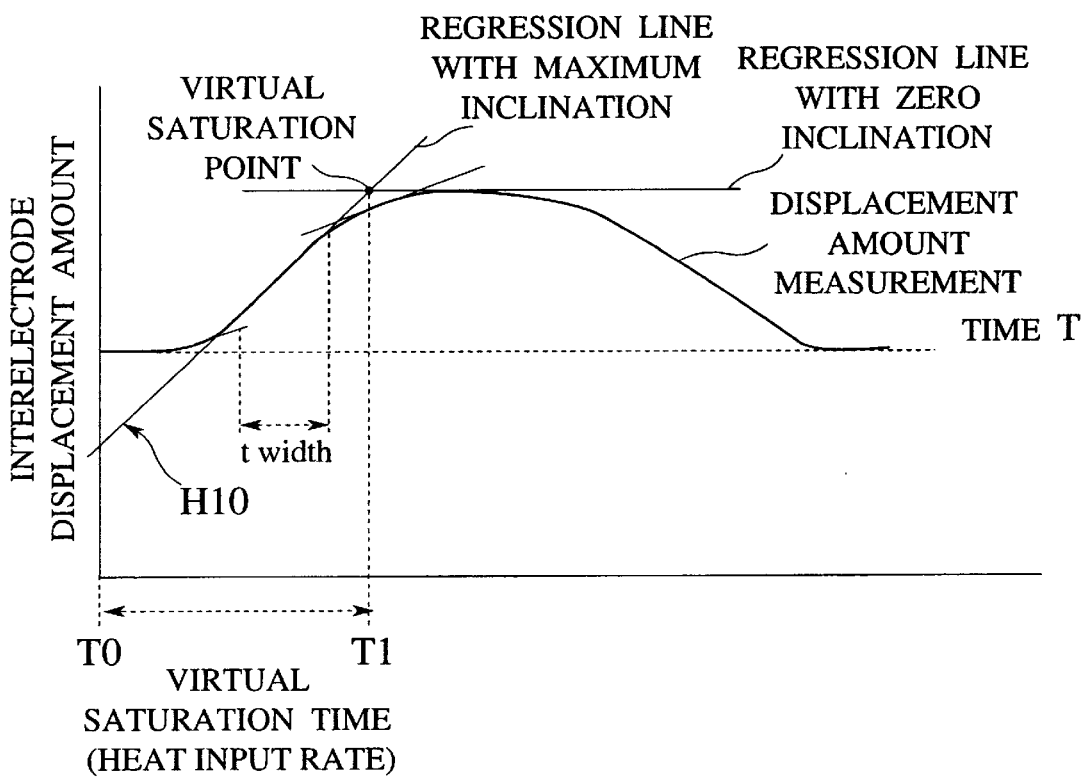
FIG. 8 is a graph describing a process for calculation of regression lines.

The arithmetic unit 24 is adapted to calculate such a regression lines as illustrated in FIG. 8 from inter-electrode displacement amount data stored in the storage Unit 26, to estimate from the calculated regression line a current density to be employed for recognition of how a current welding is developing, to compare the estimated current density with a proper current density, and to respond to a result of the comparison to make a decision of whether current welding conditions are applicable, as they are, to the welding to be achieved with a sufficient sureness or if the welding cannot be achieved with a sufficient sureness unless the current welding conditions are changed. As a result, if the welding is decided to be achieved with an insufficient sureness, there are prepared optimal welding conditions to be set in real time in the welding current controller 40 via the external input/output unit 28.

The welding current controller 40 is adapted for current conduction across the workpieces pinched between the movable electrode 12 and the fixed electrode 14 to effect a spot welding under set welding conditions.

Figure 5:
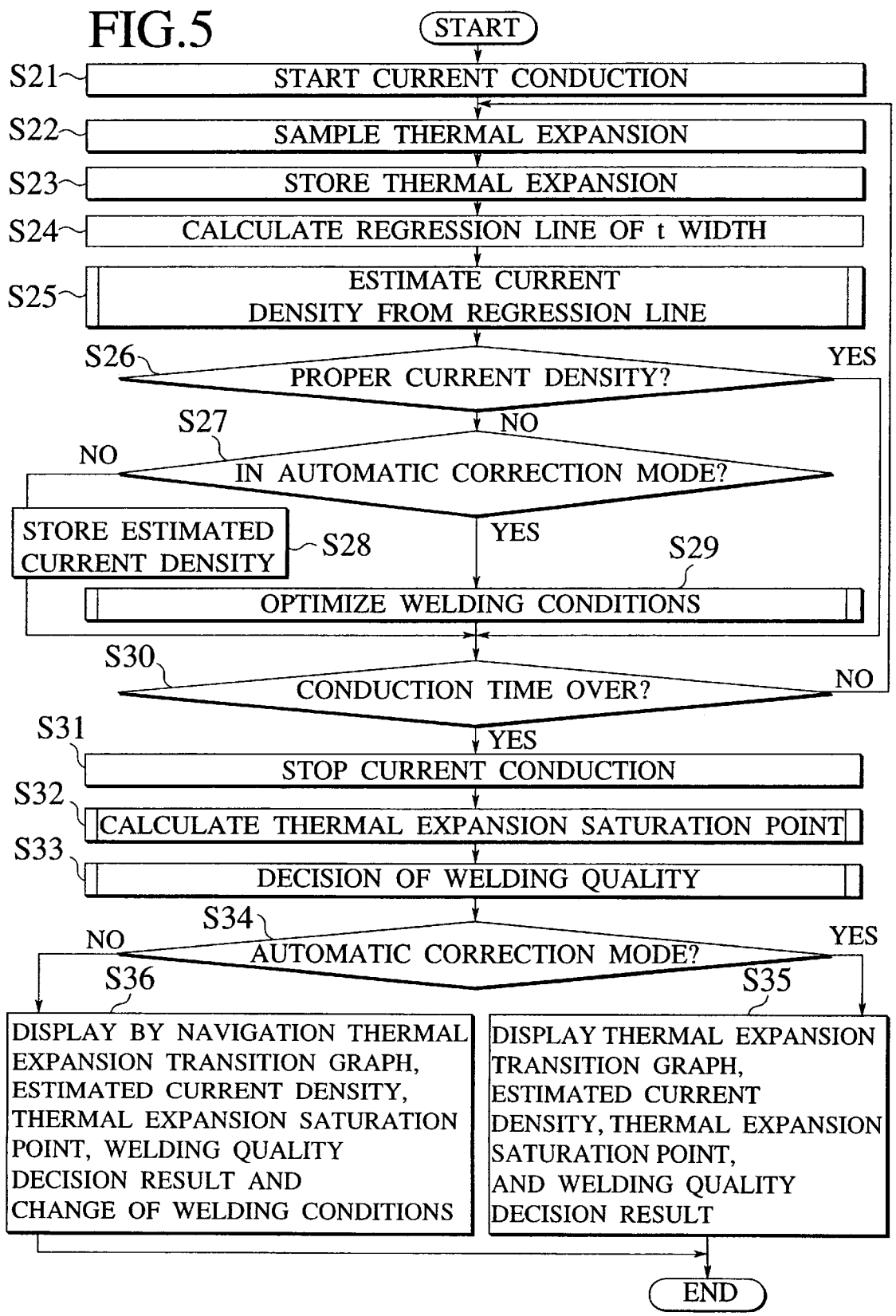
FIG. 5 is a flowchart of actions of the spot welding control system of FIG. 4.
Figure 6:
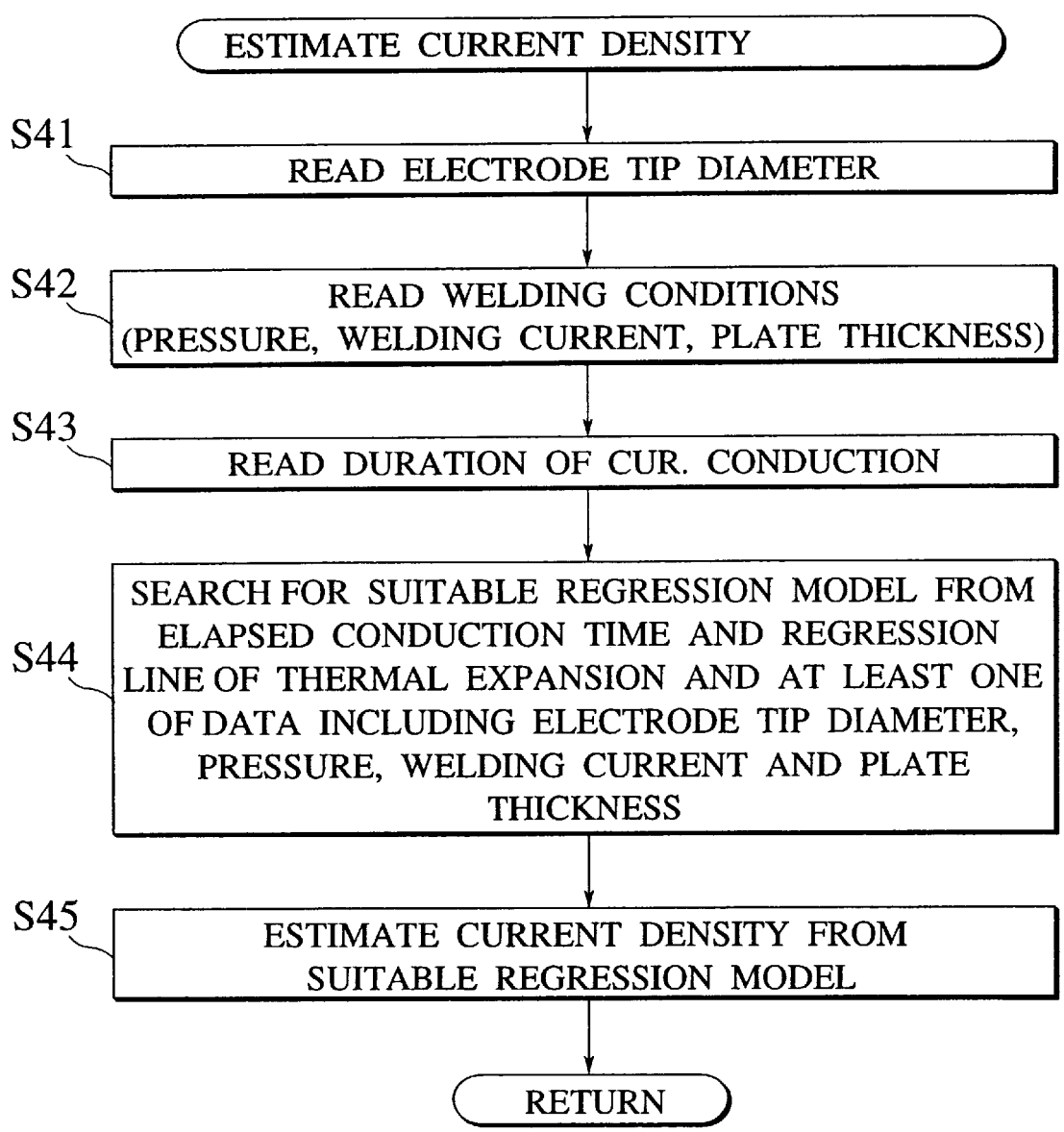
FIG. 6 is a flowchart of a subroutine for calculations to estimate a current density in the flowchart of FIG. 5.
Figure 7:
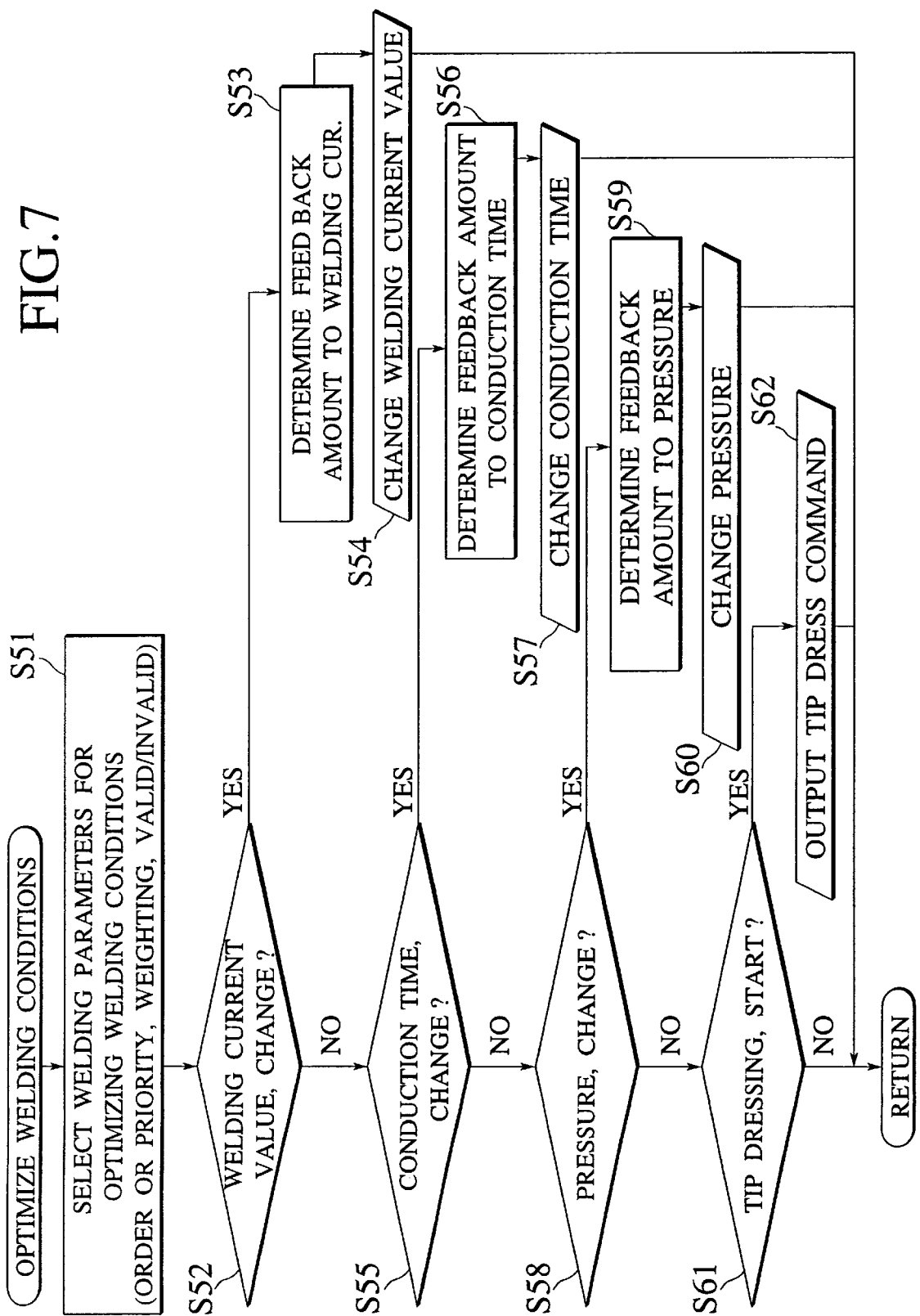
FIG. 7 is a flowchart of a subroutine of a process for optimization of welding conditions in the flowchart of FIG. 5.

FIG. 5 is a flowchart of processes covering a real time correction of welding conditions and a decision of a welding quality. FIG. 6 is a flowchart of a subroutine for estimation of a current density in the flowchart of FIG. 5. FIG. 7 is a flowchart of a subroutine of a process for optimization of welding conditions in the flowchart of FIG. 5.

Estimation of a Current Density

First, workpieces to be welded together are pressed between a movable electrode 12 and a fixed electrode 14, which are set in position to have a predetermined welding angle to The workpieces. The welding angle is kept within a range of about 5 degrees relative to a 0 degree direction that is normal to a workpiece surface, to avoid influences thereof on a welding quality. As the movable electrode 12 is lowered to a pressing position, there is started conduction of a welding current in accordance with a set welding condition (at a step S21).

As the current is conducted, the workpieces thermally expand, pushing the movable electrode 12 upwards against the pressure exerted thereon from the electrode 12, when an encoder 32 detects associated variations of a gap between the movable electrode 12 and the fixed electrode 14, as corresponding inter-electrode displacement amounts therebetween in terms of displacements of the movable electrode 12. The inter-electrode displacement amounts are sampled continuously or at very small intervals of time about 0.5 msec or 1 msec to 5 msec (at a step S22), and sampled data are stored in the storage unit 26 (at a step S23) as data on measured inter-electrode displacement amounts or of the thermal expansion. The sampling intervals may be otherwise adequately set than described, e.g. in accordance with later-described intervals of time for calculation of regression lines.

The data on measured inter-electrode displacement amounts are processed to calculate regression lines at intervals of a predetermined width of time (hereafter called "1 width"), and respective inclinations and segments of calculated regression lines are stored in the storage unit 26. As illustrated in FIG. 8, the regression lines are each obtained as a straight line on a two-dimensional plane defined by an axis of abscissa representing a time T and an axis of ordinate representing a displacement amount h. The segments of the regression lines are defined as intercepts thereof on the axis of ordinate, where the time T=0.

Each regression line thus obtained is expressed such that $h = \theta 1 \times T + HT0$, where h is an inter-electrode displacement amount, T is a time, $\theta 1$ is an inclination of the regression line, and HT0 is a value of a segment of the regression line. Such regression lines are calculated at predetermined time intervals, so that a respective regression line can be based on to make a real time decision about a state of a welding in a current time interval (at a step S24).

On the basis of a regression line thus obtained, there is estimated a density of flux of electric current conducted between the movable electrode 12 and the fixed electrode 14 across the workpieces, as an associated current density. The estimation of a current density is executed (at a step S25) along a subroutine shown by the flowchart of FIG. 6.

First, the arithmetic unit 24 reads tip end diameters of the movable electrode 12 and the fixed electrode 14 in current use and welding conditions (a welding pressure, a welding current, a current conduction time, a total thickness of the workpieces, etc.) for a current welding operation (at steps S41 and S42), as they are stored in the storage unit 26, and concurrently reads a duration time of current conduction between from a start of the welding operation (or current conduction) to a current point of time (at a step S43), as the duration time is counted by the arithmetic unit 24. Based on one or more read data (e.g. the tip end diameters of the electrodes, the welding pressure, the welding current, the current conduction time, and/or the thickness of the workpieces), the duration time of current conduction, and a regression line calculated for current use, the storage unit 26 is searched for a regression model matching with or most approximate to a set of current welding conditions (at a step S44). Then, a current density is estimated straight from a matching regression model, or by interpolation of approximate regression model(s) (at a step S45).

Optimization of Welding Conditions

Given an estimated current density thus calculated, the arithmetic unit 24 reads a proper current density for the current welding conditions, as it is stored in the storage unit 26 in advance, and compares the estimated current density with the proper current density (having a permissible range). If the estimated current density falls within a range of proper current density, there is repeated a process of the steps S22 to S25 until the current conduction Time set as a welding condition has elapsed, so that a welding operation is continued under currently set welding conditions (at steps S26 and S30).

Unless the estimated current density falls within the range of proper current density, a decision is made of whether the welding gun controller 20 is set to the automatic made for correction of welding conditions (at a step S27). Unless the welding gun controller 20 is set to the automatic correction mode, the arithmetic unit 24 stores the estimated current density in the storage unit 26. If the welding gun controller 20 is set to the automatic correction mode, there is executed a welding condition optimization process for optimizing a respective current welding condition by updating or holding, as necessary (at a step S29). The welding condition optimization process includes a subroutine having steps shown in the flowchart of FIG. 7.

For optimization of the respective welding condition, the arithmetic unit 24 reads a corresponding welding parameter stored in the storage unit 26. The welding parameter for optimization of the welding condition in concern has data fields representing an order of priority in correction of the concerned one of welding conditions to be corrected, a weighting for correction of the concerned condition, and a validity as a requirement for correction to be valid or invalid of the condition. In an exemplary case in which the welding conditions to be corrected include a welding current, a current conduction time, a pressure to be exerted, and tip end diameters of movable and fixed electrodes, welding parameters corresponding thereto have their data fields updated in accordance with a given regression model, such that a field of the order of priority is properly designated as e.g. a "first" in a parameter of the welding current, a "second" in a parameter of the current conduction time, a "third" in a parameter of the pressure, and a "fourth" in 3 parameter of the tip end diameters of the electrodes, as well as that of the weighting to be specified as e.g. a "20%" for the welding current, a "30%" for the current conduction time, a "10%" for the pressure, and a "40%" for the Lip end diameters.

If a field of the validity is set "valid" in any welding parameter, then the parameter is selected to change an associated welding condition for optimization (at a step S51), and if it is set "invalid", then the parameter is not selected for optimization and the condition is left unchanged.

When the welding parameter of the welding current is read, if it contains a valid command (as a set of data) for a change of welding condition to be effected in the designated (first) order of priority (at a step S52), then a feedback amount is determined in accordance with the specified weighting to thereby modify a current set value of the welding current. In the exemplary case, the weighting for the welding current is 20%, and therefore the current value of welding current is increased by a 20% (at steps S53 and S54).

When the welding parameter of the current conduction time is read, if it contains a valid command for a change of welding condition to be effected in the designated (second) order of priority (at a step S55), then a feedback amount is determined in accordance with the specified weighting to thereby modify a current set value of the current conduction time. In the exemplary case, the weighting for the current conduction time is 30%, and therefore the current value of current conduction time is increased by a 30% (at steps S56 and S57).

When the welding parameter of the pressure is read, if it contains a valid command for a change of welding condition to be effected in the designated (third) order of priority (at a step S58), then a feedback amount is determined in accordance with the specified weighting to thereby modify a current set value of the pressure. In the exemplary case, the weighting for the pressure is 10%, and therefore the current value of pressure is increased by a 10% (at steps S59 and S60).

When the welding parameter of the tip end diameters of the electrodes is read, if it contains a valid command for a change of welding condition to be effected in The designated (fourth) order of priority (at a step S61), then a command for dressing tips of the electrodes is output to the welding robot controller to Thereby effect a tip dressing of the movable and fixed electrodes 12 and 14 (at a step S62).

In another exemplary case in which a regression line calculated at the step S25 in the flowchart of FIG. 5 is approximate to a curve of a regression model designated as a +B rank, a welding being performed has an estimated current density deviated (excessive) from a proper current density, and a command is given to effect necessary changes of welding conditions listed in FIG. 10. In other words, there is given a command to effect a slight decrease in value of welding current, a slight decrease of current conduction time, and a slight increase of pressure to be exerted.

If associated parameters are set for the regression model, such that the order of priority is a "first" for the welding current, a "second" for the current conduction time, and a "third" for the pressure, and the weighting is a "20%" for the welding current, a "30%" for the current conduction time, and a "10%" for the pressure, then current settings of corresponding welding conditions arc changed so that the welding current is reduced by a 20%, the current conduction time is reduced by a 30%, and the pressure is increased by a 10%.

In still another exemplary case in which a calculated regression line is approximate to a curve of a regression model designated as a −C rank, a welding being performed has an estimated current density deviated (deficient) from a proper currant density, and a command is given to effect necessary changes of welding conditions listed in FIG. 10. In other words, there is given a command to effect an increase in value of welding current, and a dressing of the electrode tips.

If associated parameter settings for this regression model are such that the order of priority is a "first" for the welding current and a "second" for the tip dressing, and the weighting is a "50%" for the welding current and a "50%" for the tip dressing, then current welding conditions are changed so that the welding current is increased by a 50%, and the Tips of the movable and fixed electrodes 12 and 14 are dressed accordingly. Such welding conditions are set up every lime when a regression model is selected.

As such, current welding conditions are changed, as necessary, to provide a set of subsequent welding conditions, then a subsequent regression line is calculated under the set of subsequent welding conditions, and subsequent welding conditions are likewise changed to provide a set of still subsequent welding conditions. Like this, comprehensive and elementwise betterment of welding conditions is frequently repeated, to thereby achieve a welding state as approximate as possible to an ideal regression model designated as an A rank in FIG. 9.

In case the heat input rate is low (i.e. the inclination of regression line is small), the welding current is increased to have an increased heat input rate (i.e. to have an increased inclination of regression line). On the other band, in case the heat input rate is high (i.e. the inclination of regression line is large), the welding current is decreased to have a decreased heat input rate (i.e. to have a decreased inclination of regression line). As a result, flash and expulsion are suppressed, permitting a favorable welding in a short time.

There will be detailed effects of a welding according to the present embodiment.

Figure 11:
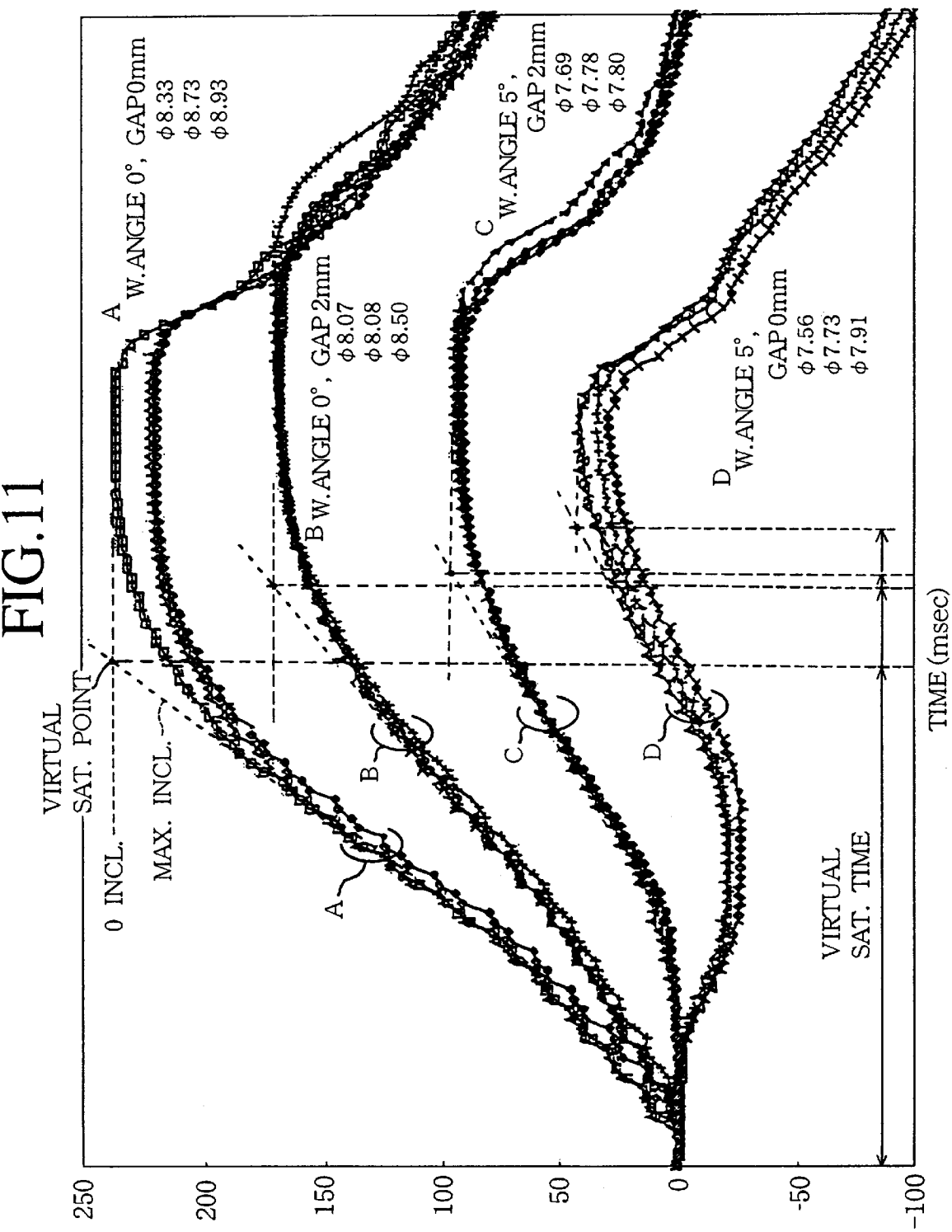
FIG. 11 is a graph describing different attributes of sets of inter-electrode displacement amount data under different conditions with and without gaps and specified welding angles.

FIG. 11 is a graphic illustration of time-dependent variations of inter-electrode displacement amount in spot welding operations performed under like welding conditions, with various gaps between workpieces to be welded together, as in FIG. 12A, and with various welding angles to workpieces, as in FIG. 13A.

FIG. 11 shows relationships between the inter-electrode displacement amount and the time in cases where the spot welding is actually performed at three points with different welding angles to and different gaps (plate gaps) between the workpieces, using electrodes of a tip end diameter of 8.0 mm. In the Figure, a ø-value represents an actual measure of a nugget diameter, which constitutes an index for a conformity of a welding state to be decided by a destructive inspection of a weld zone after the welding of each sample. Except for the welding angle and the plate gap, associated welding conditions such as of current conduction are kept unchanged.

As will be seen from FIG. 11, combinations of different welding angles and different plate gaps lead to different displacement amounts in thermal expansion, as well as different times for a saturation in terms of a virtual Saturation point to be reached as illustrated in FIG. 8. The time for the virtual saturation point to be reached (a virtual saturation time) is correlated with the beat input rate. Namely, the longer the virtual saturation time is, the lower the heat input rate becomes, leading to a narrower (or smaller) nugget diameter. Such a tendency indicates that heat input rate and nugget size are correlated with each other independently of welding angle and plate gap. Therefore, if a heat input rate is known, one can estimate how much the welding current should be increased to achieve an adequate welding. In FIG. 11, three sets of data are sampled for a respective combination of conditions of welding angle and plate gap, whereas one data set is concerned for simplicity in presentation of regression lines, virtual saturation points and virtual saturation times, as shown by dotted lines The remaining data sets have like tendencies to the data set in concern.

There will be described characteristic tendencies to be observed in FIG. 11, concerning thermal expansion when welding.

For sampling purpose, 4 plurality of plates are piled to be welded, with or without gaps between electrodes 12, 14 and outer plates as well as between plates. As concerned in FIG. 11, there are sampled data sets A and B for plate gaps of 0 mm and 2 mm (or more), respectively, with a welding angle of 0 degree, and data sets C and D for plate gaps of 0 mm and 2 mm (or more), respectively, with a welding angle of 5 degrees. In the case of 0-degree welding angle, the data set A for a gap-less sample (with a 0-mm gap) exhibits a greater tendency than that B for a gapped sample (with a 2-mm gap) to have a developed inter-electrode displacement. In this case, as current conduction is started, it may be caused for plates of the gapped sample to melt, getting soften and flexible, so that the inter-electrode displacement amount and its increasing rate, i.e. inclination, are both reduced.

To the contrary, in the case of 5-degree welding angle, the data set D for a gap-less sample (with a 0-mm gap) exhibits a smaller tendency than that C for a gapped sample (with a 2-mm gap) to have d developed inter-electrode displacement. In this case, the exhibited tendency contradicts such a supposition that a gapping might have allowed for a flexion to cause a reduced displacement amount. This tendency under the condition of 5-degree welding angle may be explained such that, as plates are gapped, they have their bending strengths and are adapted, by a welding angle to be sufficient about 5 degrees, to deform relatively easily with welding forces acting thereon from the electrodes 12 and 14, so that their deformations with the welding forces absorb one or more gaps the plates had (between them) just before, current conduction, thus resulting in an equivalent state to what they should have in a gap-less welding. However, due to an inclined welding angle, the plates to be welded together are subjected to insufficiencies in contact with the electrodes 12 and 14 (in the form of local gaps therebetween), which could not be sufficiently complemented simply by imposition of welding forces, with the result that the data sets C and D have displacement amounts and inclinations both smaller than those of the data sets A and B.

Further,in respect of the data set D, as the plate gap has been initially set to a zero, the plates to be welded together act as an integral workpiece having an increased rigidity or strength, so that the workpiece hardly deforms, and the contact insufficiency due to an inclined welding angle may be less complemented than the case (of the date set C) in which workpieces to be welded together has been initially gapped and are still allowed to slightly deform, thus resulting in a greater balance of influence of the inclined welding angle causing the displacement amount as well as the inclination to be smaller than those of the data set C.

As such, it is difficult for welding angles and/or plate gaps to be simply based on to estimate how the nugget diameter varies. According to the embodiment, however, as described, irrespective of how the welding angle and/or the plate gap may be, there can be finally achieved an equivalent welding to what is welded under ideal welding conditions.

As such, there are repeated corrections of welding conditions, and after a lapse of current conduction time (at a step S30 in the flowchart of FIG. 5), the welding current controller 40 stops supplying a welding current to the electrodes (at a step S31), and a welding operation is completed.

Judgment of a Spot Welding

In a spot welding, displacements of the movable electrode 12 are input us a temporal sequence of inter-electrode displacement amount data to the data processing unit 22, and stored in the storage unit 26. The stored temporal sequence of inter-electrode displacement amount data in the storage unit 26 is read to the arithmetic unit 24, where it is processed to be virtually recognized as a set of plots on a coordinate plane, like the graph of FIG. 11. In the field of virtual recognition, there is calculated a point of intersection between a regression line with a zero inclination and a representative curve of inter-electrode displacement amount data actually obtained, to thereby determine a saturation point of a thermal expansion associated with the spot welding (at a step S32), and based on the saturation point, there are calculated an expansion rate, a saturated thermal expansion, a saturation time, and a contraction time of an associated welding, which are compared with an expansion rate, a saturated thermal expansion, a saturation time, and a contraction time stored in advance as elements of an ideal welding model in the storage unit 26, To thereby effect a decision on a quality of the welding (at a step S33).

In the case of a decision based on a reference inter-electrode displacement amount stored in advance in the storage unit 26, an inter-electrode displacement amount data is compared with the reference inter-electrode displacement amount, and if they match, it is decided that and associated welding has a conforming quality (at the step S33).

Then, if the welding gun controller 20 is in the automatic correction mode (at a step S34), there is displayed on a display (not shown) a thermal expansion transition graph indicating a progress of the welding as in FIG. 11, as well as an estimated current density, a thermal expansion saturation point, and a result of the decision on welding quality (at a step S35). Unless the welding gun controller 20 is set in The automatic correction mode, there is displayed a navigation picture allowing for an operator to manually change welding conditions, in addition to information displayed in the automatic correction mode. Thus, the operator can change any welding condition, observing the display (at a step S36).

According to this embodiment, detected inter-electrode displacement amounts are compared with stored reference inter-electrode displacement amounts, for a setting of welding conditions, permitting their real time change in accordance with a time-dependent variation of welding state, allowing a maintained optimal welding.

Further, detected inter-electrode displacement amounts corrected in dependence on a detected wear 4mount of electrodes, permitting an optimal welding to be maintained.

Further, welding conditions are set after comparison between a regression line calculated from detected inter-electrode displacement amounts and a stored reference regression line, allowing for a real time change of welding condition to depend a time-dependent variation of welding state, permitting a maintained optimal welding.

The entire contents of Japanese Patent Applications No. 10-109198 (filed Apr. 20, 1998) and No. 10-252591 (filed Sep. 7, 1998) are incorporated herein by reference.

While preferred embodiments of the present invention have been described using particular terms, such description is for illustrative purposes, and it is to be understood that changes and variations may be made without departing from the spirit or scope of the following claims.

What is claimed is:

1. A spot welding control system comprising:
a pair of electrodes pressing a welding object, conducting a current through the welding object;
an inter-electrode displacement amount detector substantially continuously detecting an inter-electrode displacement amount of the pair of electrodes;
a regression line calculator calculating a regression line from inter-electrode displacement amounts detected by the inter-electrode displacement amount detector;
a reference regression line memory having stored therein a reference regression line based on a reference inter-electrode displacement amount;
a comparator comparing the regression line calculated by the regression line calculator with the reference regression line stored in the reference regression line memory;
a welding condition setter setting a welding condition of the welding object in accordance with a result of comparison by the comparator; and
a current conduction controller controlling a current conducting state of the pair of electrodes in dependence on the welding condition set by the welding condition setter.

2. The spot welding control system of claim 1, wherein the welding condition setter sets the welding condition so that a regression line calculated by the regression line calculator coincides with the reference regression line stored in the reference regression line memory.

3. The spot welding control system of claim 1, wherein the welding condition comprises one of a welding current between the pair of electrodes and the welding object, the welding current being variable, a conduction time of the welding current, the conduction time being variable, and a pressing force acting on the welding object from the pair of electrodes, the pressing force being variable.

4. The spot welding system of claim 3, wherein the one of the welding current, the conduction time, and the pressing force of the welding condition has an order of priority therebetween and a weighting set thereamoung.

5. A spot welding control system comprising:
a pair of electrodes for pressing a welding object, conducting a current through the welding object;
inter-electrode displacement amount detection means for substantially continuously detecting an inter-electrode displacement amount of the pair of electrodes;
regression line calculation means for calculating a regression line from inter-electrode displacement amounts detected by the inter-electrode displacement amount detection means;
reference regression line storage means for storing therein a reference regression line based on a reference inter-electrode displacement amount;
comparison means for comparing the regression line calculated by the regression line calculation means with the reference regression line stored in the reference regression line storage means;
welding condition setting means for setting a welding condition of the welding object in accordance with a result of comparison by the comparison means; and
current conduction control means for controlling a current conducting state of the pair of electrodes in dependence on the welding condition set by the welding condition setting means.

6. A spot welding control system comprising:
a pair of electrodes pressing a welding object, conducting a current through the welding object;
a wear amount detector detecting a wear amount of the pair of electrodes;
an inter-electrode displacement amount detector substantially continuously detecting an inter-electrode displacement amount of the pair of electrodes;
a regression line calculator correcting inter-electrode displacement amounts detected by the inter-electrode displacement amount detector in dependence on the wear amount detected by the wear amount detector and calculating a regression line from corrected inter-electrode displacement amounts;
a reference regression line memory having stored a reference regression line based on a reference inter-electrode displacement amount;
a comparator comparing the regression line calculated by the regression line calculator with the reference regression line stored in the reference regression line memory;

a welding condition setter setting a welding condition of the welding object in accordance with a result of comparison by the comparator; and a current conduction controller controlling a current conducting state of the pair of electrodes in dependence on the welding condition set by the welding condition setter.

7. The spot welding control system of claim 6, wherein the welding condition setter sets the welding condition so thus a regression line calculated by the regression line calculator coincides the reference regression line stored in the reference regression line memory.

8. The spot welding control system of claim 6, wherein the welding condition comprises one of a welding current between the pair of electrodes and the welding object, the welding current being variable, a conduction time of the welding current, the conduction time being variable, and a pressing force acting on the welding object from the pair of electrodes, the pressing force being variable.

9. The spot welding system of claim 8, wherein the one of the welding current, the conduction time, and the pressing force of the welding condition has an order of priority and a weighting set thereamoung.

10. A spot welding control system comprising:

a pair of electrodes for pressing a welding object, conducting a current through the welding object;

wear amount detection means for detecting a wear amount of the pair of electrodes;

inter-electrode displacement amount detection means for substantially continuously detecting an inter-electrode displacement amount of the pair of electrodes;

regression line calculation means for correcting inter-electrode displacement amounts detected by the inter-electrode displacement amount detection means in dependence on the wear amount detected by the wear amount detection means and calculating a regression line from corrected inter-electrode displacement amounts;

reference regression line storage means for storing therein a reference regression line based on a reference inter-electrode displacement amount;

comparison means for comparing the regression line calculated by the regression line calculation means with the reference regression line stored in the reference regression line storage means;

welding condition setting means for setting a welding condition of the welding object in accordance with a result of comparison by the comparison means; and current conduction control means for controlling a current conducting state of the pair of electrodes in dependence on the welding condition set by the welding condition setting means.

11. A spot welding control method comprising:

pressing a welding object by a pair of electrodes, conducting a current through the welding object;

substantially continuously detecting an inter-electrode displacement amount of the pair of electrodes during the conducting;

calculating a regression line from detected inter-electrode displacement amounts;

comparing the calculated regression line with a preset reference regression line;

setting a welding condition of the welding object in accordance with a result of comparison; and controlling a current conducting state of the pair of electrodes in dependence on the set welding condition.

12. The spot welding control method of claim 11, wherein the welding condition comprises one of a welding current between the pair of electrodes and the welding object, the welding current being variable, a conduction time of the welding current the conduction time being variable, and a pressing force acting on the welding object from the pair of electrodes, the pressing force being variable.

13. A spot welding control method conspiring:

detecting a wear amount of a pair of electrodes;

pressing a welding object by the pair of electrodes, conducting a current through the welding object;

substantially continuously detecting an inter-electrode displacement amount of the pair of electrodes during the conducting;

correcting detected inter-electrode displacement amounts in dependence on the detected wear amount;

calculating a regression line from corrected inter-electrode displacement amounts;

comparing the calculated regression line with a preset reference regression line;

setting a welding condition of the welding object in accordance with a result of comparison; and controlling a current conducting state of the pair of electrodes in dependence on the set welding condition.

14. The spot welding control method of claim 13, wherein the welding condition comprises one of a welding current between the pair of electrodes and the welding object, the welding current being variable, a conduction time of the welding current, the conduction time being variable, and a pressing force acting on the welding object from the pair of electrodes.

15. A spot welding control method comprising:

controlling a pressure exerted on a welding tip, using a servo motor;

setting a reference position for detection of a displacement amount to be a position for the welding up to contact on a workpiece without pressure lowering the welding tip from the reference position by a movement amount to press the workpiece together with the electrode tip;

setting a reference pressing position to be an end position of the electrode tip calculated from the reference position and the movement amount;

calculating a plate thickness of the workpiece and an allowance for the workpiece to be welded, relative to the reference pressing position; and changing a welding condition with a decision for presence of a gap in the workpiece or of an inadequate welding angle, when the end position of the welding tip exceeds a range of the allowance.

* * * * *